April 13, 1926.

A. M. LEYNER 1,580,145

HARROW

Filed April 19, 1924    2 Sheets-Sheet 1

Inventor
Albert M. Leyner.

By H.J. O'Brien

Attorney

April 13, 1926.
A. M. LEYNER
1,580,145
HARROW
Filed April 19, 1924    2 Sheets-Sheet 2
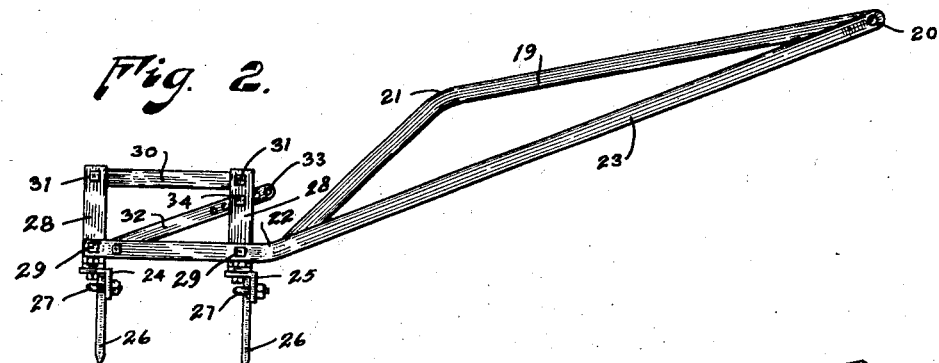
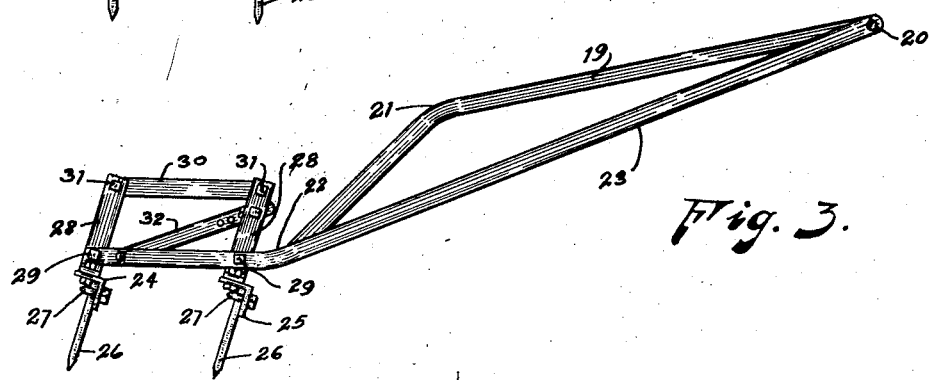
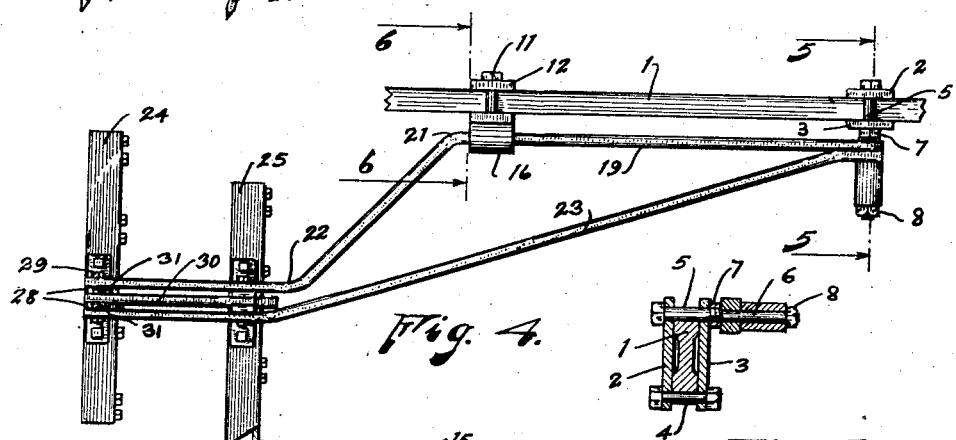
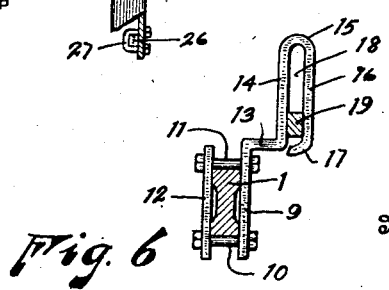
Inventor
Albert M. Leyner.
By A. J. O'Brien
Attorney Patented Apr. 13, 1926.

1,580,145

UNITED STATES PATENT OFFICE.

ALBERT M. LEYNER, OF LAFAYETTE, COLORADO.

HARROW.

Application filed April 19, 1924. Serial No. 707,602.

*To all whom it may concern:*

Be it known that I, ALBERT M. LEYNER, a citizen of the United States, residing at Lafayette, county of Boulder, and State of Colorado, have invented certain new and useful Improvements in Harrows; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in harrows of a type adapted to be attached to plows for the purpose of harrowing the soil as it is plowed.

It is well known to all who have had any experience in agriculture that the proper time to harrow the soil is as soon as possible after it has been plowed, as it is then moist and friable. If the soil is left unharrowed for some time after it is plowed, the moisture will evaporate and the lumps will harden to such an extent that when the harrowing is finally done, the seed bed will be full of small hard lumps which is objectionable. In addition to the reason pointed out above, it is also desirable to harrow the ground as fast as it is plowed, for in this manner much valuable time is saved. In cases where a farmer has one team only, it is evident that he must cease plowing while he operates the harrow, which causes considerable delay.

It is the object of this invention to produce a harrow that can be attached to any ordinary plow and which will harrow the soil immediately after it has been turned by the plow and in this way the soil is harrowed at the optimum time and both the plowing and the harrowing are finished at the same time.

My invention consists in the combination and relation of parts that will now be described in detail, reference for this purpose being had to the accompanying drawing, in which the preferred form of my invention is shown, and in which:

Fig. 2 is a side elevation of the harrow showing the same detached from the plow and with the teeth in substantially vertical position;

Fig. 3 is a view similar to that shown in Fig. 2, but with the teeth adjusted so as to slant rearwardly;

Fig. 4 is a top plan view of the harrow showing also a portion of the plow beam;

Fig. 5 is a section taken on line 5—5, Fig. 4; and

Fig. 6 is a section taken on line 6—6, Fig. 4.

Figure 1:
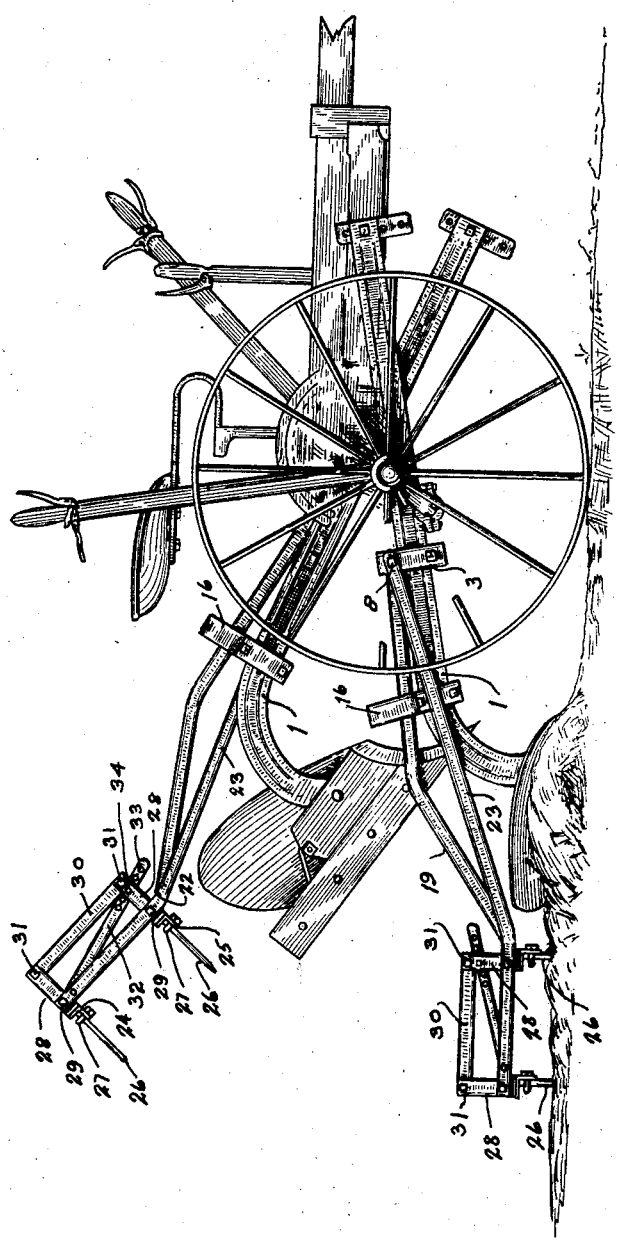
Fig. 1 is a side elevation of a plow equipped with my improved harrows.

Numeral 1 represents the beam of a plow. Secured to this beam at a point near the front end thereof is a clamp comprising two plates 2 and 3. These plates are identical in shape and size, each plate having a hole near each end. A bolt 4 extends through the plates below the beam and a second bolt 5 connects this at the top. Bolt 5 has an extension 6 of somewhat smaller diameter than the main portion thereof. A nut 7 serves to clamp the bars 2 and 3 at the top and a second nut 8 cooperates with the outer end of the reduced portion 6. A guide member is secured to the plow beam to the rear of the clamps above described. This guide consists of a bar having a straight portion 9 provided with spaced openings for the reception of the bolts 10 and 11, which also pass through the flat bar 12. The guide member has a portion 13 bent at right angles to the straight portion 9 and connects it with the vertical portion 14, which is reversely bent at 15 and has a downwardly extending part 16 whose end 17 is bent towards the side 14, thereby forming an elongated opening 18 for the reception of the hitch bar 19. This bar has its end provided with an opening 20 and has a straight part extending to the point 21. The opening 20 is adapted to receive the portion 6 of bolt 5. From points 21 to 22, hitch bar 19 has a straight part that inclines downwardly and to the side and from point 22 to the end it is straight. A second hitch bar 23 has its end provided with an opening that corresponds to the opening 20 in bar 19 and has its other end bent so that it is substantially parallel with the extreme free end of the bar 19. The harrow comprises two parallel angle iron bars 24 and 25, to which the teeth 26 are secured by means of eye bolts 27. To the upper side of each angle I secure two brackets 28 to the outsides of which bars 19 and 23 are pivotally connected by means of bolts 29. A bar 30 is mounted between the upper ends of the brackets 28 and is held in place by bolts 31. The rear ends of the bars 19 and 23, the brackets 28 and the bar 30 form a rectangle. In order to hold the teeth in adjusted position, I provide a diagonal bar 32 that has one end provided with a plurality of holes 33 for the reception of the bolt 34. It is evident that the diagonal bar 32 prevents the rectangle from changing and that it therefore serves as an adjusting means, which permits the teeth to be held straight as shown in Fig. 2 or to be slanted as shown in Fig. 3.

It is evident from the above description, that when my harrow is attached to the plow it will harrow the soil directly after it has been turned and while it is still moist and friable. The guide slot 18 permits the harrow a slight up and down motion and at the same time prevents it from moving sidewise.

From the above it will be apparent that I have produced a novel and useful harrow that can be attached to any ordinary plow and which will harrow the soil immediately after it is turned by the plow. The harrow is provided with adjusting means by which the slant of the teeth can be varied to conform to the character of the soil and the attachment to the plow is such that it permits the harrow to move vertically with respect to the ground.

Having now described my invention, what I claim as new is:

Means for pivotally connecting a hitch member to a plow beam comprising two bars, each having an opening near each end, a clamping bolt extending through the openings in the bars, at each end, one of the said bolts having a threaded portion intermediate its ends and a threaded end portion, that part of the bolt between said threaded portions being adapted to serve as a pivot for hitch bars by means of which a harrow is secured to a plow.

In testimony whereof I affix my signature.

ALBERT M. LEYNER